(12) United States Patent
Durairaj et al.

(10) Patent No.: US 11,954,726 B1
(45) Date of Patent: Apr. 9, 2024

(54) AUGMENTED REALITY VEHICLE PURCHASING EXPERIENCE

(71) Applicant: UIPCO, LLC, San Antonio, TX (US)

(72) Inventors: Ravi Durairaj, San Antonio, TX (US); Elena Marie Carrasco, Converse, TX (US); Sumita T. Jonak, San Antonio, TX (US); Nathan Lee Post, Rockport, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 312 days.

(21) Appl. No.: 17/385,569

(22) Filed: Jul. 26, 2021

Related U.S. Application Data

(60) Provisional application No. 63/058,414, filed on Jul. 29, 2020.

(51) Int. Cl.
| | |
|---|---|
| *G06Q 30/0601* | (2023.01) |
| *G06T 19/00* | (2011.01) |
| *G06T 19/20* | (2011.01) |
| *G06V 20/20* | (2022.01) |

(52) U.S. Cl.
CPC ..... *G06Q 30/0643* (2013.01); *G06Q 30/0629* (2013.01); *G06T 19/006* (2013.01); *G06T 19/20* (2013.01); *G06V 20/20* (2022.01)

(58) Field of Classification Search
CPC ...... G06T 19/006; G06V 10/40; G06V 10/54; G06V 10/56; G06V 10/58; G06V 10/62; G06V 10/70; G06V 10/74; G06V 20/20; G06V 20/60; G06V 20/64; G06Q 30/015; G06Q 30/06; G06Q 30/0601–0645; G06Q 30/0281
See application file for complete search history.

(56) References Cited

U.S. PATENT DOCUMENTS

| | | | |
|---|---|---|---|
| 10,949,670 B1* | 3/2021 | Plougmann | G07G 1/01 |
| 2002/0026369 A1* | 2/2002 | Miller | G06Q 30/0623 |
| | | | 705/14.27 |
| 2018/0012282 A1* | 1/2018 | Mattingly | G06Q 30/0641 |

(Continued)

OTHER PUBLICATIONS

The Amazing Ways Augmented Reality Is Transforming Car Retail. Forbes. Bernard Marr. Aug. 9, 2019. (Year: 2019).*

*Primary Examiner* — William J Allen
(74) *Attorney, Agent, or Firm* — Potomac Law Group, PLLC; Dannon G. Allbee

(57) ABSTRACT

The present embodiments relate to an Augmented Reality (AR) vehicle buying experience. A client can provide a series of client information, such as characteristics of a desired vehicle. A specified vehicle can be identified and characteristics of that vehicle can be identified. The characteristics of the vehicle can then be compared with the desired vehicle characteristics provided by the client to determine whether the vehicle corresponds to the desired vehicle of the client. Responsive to determining that the specified vehicle corresponds to the desired vehicle of the client, the client AR display can be updated to highlight the specified vehicle depicted in the display. Alternatively, responsive to determining that the specified vehicle does not correspond to the desired vehicle of the client, the client AR display can be updated to obfuscate (e.g., grey out) the specified vehicle in the display.

17 Claims, 7 Drawing Sheets

(56) References Cited

U.S. PATENT DOCUMENTS

| | | | | |
|---|---|---|---|---|
| 2019/0206130 A1* | 7/2019 | Ericson | ............. | G06Q 30/0643 |
| 2019/0244436 A1* | 8/2019 | Stansell | .................. | G06T 19/20 |
| 2020/0342521 A1* | 10/2020 | Tang | ................. | G06Q 30/0643 |
| 2021/0034684 A1* | 2/2021 | Iyer | ....................... | G06N 3/047 |
| 2022/0351511 A1* | 11/2022 | Furlan | ................. | G01C 21/005 |

\* cited by examiner

AUGMENTED REALITY VEHICLE PURCHASING EXPERIENCE

CROSS-REFERENCE TO RELATED APPLICATION

This application is a non-provisional of and claims priority to U.S. Provisional Application No. 63/058,414 filed on Jul. 29, 2020, entitled "AUGMENTED REALITY VEHICLE PURCHASING EXPERIENCE," which is hereby incorporated by reference in its entirety for all purposes.

BACKGROUND

Augmented reality (AR) technology is used to add virtual objects to a digital display to enhance user experience. For example, when a user uses a mobile device equipped with AR technology to look at stars in the sky, the application on the mobile device can add lines to connect stars in a constellation and can add a text identifying the various constellations. Thus, AR technology can be used to add content to a real-world image to enhance user experience.

Figure 1A:
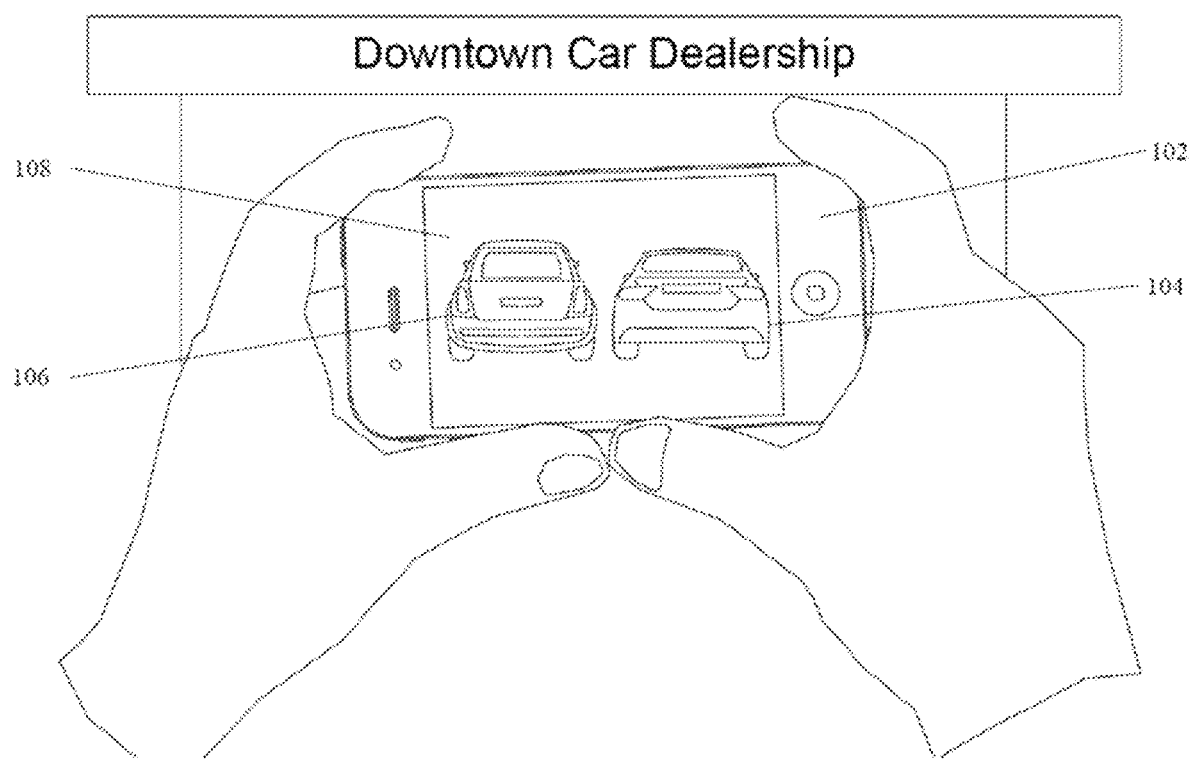
FIG. 1A shows an example embodiment where a user device receives image data of a real-world that includes two cars.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

AR technology is generally used to add a layer of information to a display of a real-world image. For instance, computer-generated information can be displayed over a depiction of a real-world environment. Thus, AR technology can increase the amount of information that is presented to the user.

In some embodiments, AR technology is used to obscure, hide, or remove certain content from a display to provide a personalized experience to a user for various reasons. For example, the system can obscure items based on the user's financial budget (e.g., certain items are obscured to help the user stay within a budget), health goals (e.g., certain foods are obscured at the grocery store to help the user stick to a diet), environmental or safety goals (e.g., certain items are removed that do not meet safety or environmental standards), or other user preferences.

When shopping on the internet, vendors can offer users a way to filter goods displayed based on a price limit. However, when shopping in the physical world, a user cannot similarly filter his or her choices based on a price of the item or some other criteria. Thus, shoppers can be susceptible to purchasing items outside of their budget or purchasing items that do not meet the user's preferences. Shoppers can also succumb to up-sell tactics from a salesperson. This is especially relevant when shopping for big ticket items such as cars, furniture, or electronics.

The present embodiments relate to an Augmented Reality (AR) vehicle buying experience. A client can provide a series of client information, such as characteristics of a desired vehicle. A specified vehicle can be identified and characteristics of that vehicle can be identified. The characteristics of the vehicle can then be compared with the desired vehicle characteristics provided by the client to determine whether the vehicle corresponds to the desired vehicle of the client. For example, if an estimated maintenance cost for a specified vehicle is within a desired range specified by the client, the specified vehicle can correspond the desired vehicle of the client. Responsive to determining that the specified vehicle corresponds to the desired vehicle of the client, the client AR display can be updated to highlight the specified vehicle depicted in the display. Alternatively, responsive to determining that the specified vehicle does not correspond to the desired vehicle of the client, the client AR display can be updated to obfuscate (e.g., grey out) the specified vehicle in the display.

The present embodiments can provide an enhanced vehicle buying experience using an AR-enabled device that can support a client during a vehicle buying experience. The system can tap into inventory at vehicle vendors and highlight vehicles based on what client is looking for. Participating dealers can provide inventory information. The system can use an AR-enabled device to grey out certain vehicles based on whether the vehicle information corresponds to the desired features for a vehicle.

While a vehicle and/or a vehicle purchasing experience may be used as an illustrative example, the present embodiments are not limited to such an example. The present embodiments can relate to any identifiable object. For instance, the present embodiments can provide an electronic device (e.g., computer, mobile phone) AR-based purchasing experience.

Figure 1B:
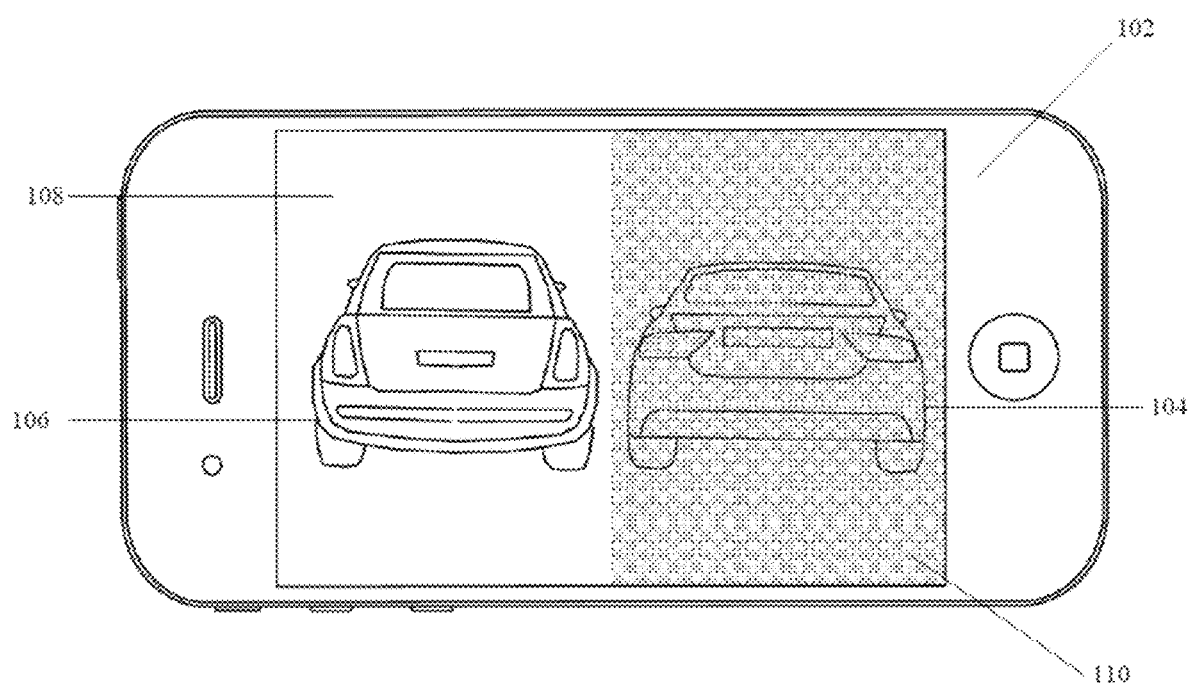
FIG. 1B shows an example embodiment where one or more items having a value greater than a user's budget is obscured on a display.

Turning now to the Figures, FIGS. 1A and 1B shows embodiments where one or more items having a value greater than a user's budget is obscured, or hid, or removed on a display. FIG. 1A shows a user device 102 receiving image data of a real-world that includes two cars 104, 106 parked in a car dealership using a user device 102. The user device 102 can include a phone, a tablet, a digital eyeglass device, or other wearable technology such as a helmet styled device with a visor or a digital contact lens. The user device 102 can receive image data of an area 108 that includes one or more items from the real world. The image data is wirelessly sent by the user device 102 to a server (not shown) that can process the image data to determine the identities and values of the one or more items. In an example, the server determines the identities, values, or other information (e.g., safety, emissions) of the two cars 104, 106 and sends the identity and value information back to the user device 102. The user device 102 and the server can send information to each other using Wi-Fi or cellular signals.

In some embodiments, a user device can obscure one or more items by blurring the item, graying out the item, or obscuring source-identifying information of the item. Source-identifying information can include a grill guard on a car, an emblem, or a shape. The obscuring or hiding of one or more items that are outside of the user's budget can better indicate to the user what item or items to choose from to stay within a prescribed budget or other preference.

Various methods can be used to obscure or hide an item. Such methods may be used depending on factors such as the environment of the user, the user's preferences, and the computational capabilities of the software and hardware. Examples of methods of obscuring an item can include obscuring by inserting an opaque polygon into the image or moving video image (the polygon can be white, black or any color), obscuring by inserting a semi-transparent polygon into the image or moving video image (the polygon can be white, black or any color tint), obscuring by any of the two aforementioned methods and adding text or icons that tells the user which object was recognized and why it is obscured (e.g. item is more expensive than the set budget), obscuring by pixelating an object, obscuring by reconstructing the inferred background of an object, giving the impression to the user that the object is not there or that it is invisible, etc.

A benefit of obscuring items for purchase can be that it allows the user to make better decisions to meet financial or other goals. Another benefit of obscuring items can be that it can help dissuade the user from purchasing more expensive items that exceed the user's budget.

In some embodiments, the area of the augmented reality device that is obscured can be used to recommend other products. In an example, assuming that a sporty car outside the user's budget was blurred, the recommendation area can mention a similar product within the user's budget such as "If you are looking for a sporty car, we recommend an XYZ car."

While FIGS. 1A and 1B disclose an embodiment where a single user device can operate with a server, in some embodiments, a user device can include two devices, such as a mobile device and a display device, that can operate with each other and a server to perform the real-time overlay on an image displayed on the display device. As an example, a display device, such as a digital eyeglass device, can receive image data from a camera and can send the image data to a mobile device, such as a phone or a tablet, that sends the image data to the server. In some embodiments, the server can determine the identity and one or more values or characteristics of the item. When the mobile device receives the one or more values from the server, the mobile device can determine whether an item should be obscured by comparing a value to a pre-determined value as described in this patent document. In other embodiments, the server determines which items should be obscured and the mobile device is simply used as a proxy. If the mobile device (or server) determines that an item should be obscured, the display device, such as a digital eyeglass device, that display the image can obscure in real-time on the displayed image the item. In some embodiments, the mobile device may transmit to the display device information about the area to obscure. In some other embodiments, the display device and the mobile device can work together to form an object understanding of the scene, and after retrieving price and other identifying information about the items, the mobile device can transmit to the display device the shared item identifier of the item to obscure. The mobile device and the display device can communicate with each other using wireless technology, for example, Wi-Fi or Bluetooth.

In some embodiments, a maximum pre-determined value can be set by a user in decision-making contexts other than financial decisions. For example, a user device can obscure one or more items on a supermarket shelf having a number or calories or an amount of sugar that is greater than a maximum pre-determined value set by a user or recommended by a health application or service used by the user. Based on the image data received by the user device and sent to the server, the server can identify and can provide to the user device the nutritional value of the one or more items. The user device can obscure in real-time on the displayed image the one or more items on the supermarket shelf if the user device determines that a nutritional value of the one or more items is out of range compared to a pre-determined range set by a user or recommended by a health application or service used by the user. A benefit of obscuring some food items is that it allows the user to make personalized and better health-related decisions.

In some embodiments, a user can set a minimum pre-determined value for the item or category of item having certain minimum characteristics, for example, a fuel economy of a car, the safety rating of a car, a nutritional value of a food item, a product rating, or date of manufacture of an item. Based on the image data received by the user device and sent to the server, the server can identify and can provide to the user device the minimum characteristics values of the one or more items. The user device can obscure in real-time on the displayed image one or more items if the user device determines that the values of the minimum characteristics of the one or more items is less than a minimum pre-determined value set by a user. In some embodiments, a user can set a budget as a minimum characteristic so that one or more items having a value less than a minimum budget can be obscured to allow a user to view a displayed item having a value that is greater than the minimum set budget.

The minimum or maximum pre-determined value can be set by a user. For example, a user can set a safety rating of 4.0 or above or a fuel economy of 30 miles per gallon or above as a preferred minimum pre-determined value. In some embodiments, a user may set both a minimum and maximum pre-determined value for an item characteristic so that one or more items that fall outside a pre-determined range can be obscured.

The pre-determined values and designations to identify whether the pre-determined values are maximum or minimum values can be stored on an application on the user device or it can be stored on a server to be obtained by the user device. In some embodiments, a server can determine whether a value of an item is greater than a maximum pre-determined value or the server can determine whether a value of an item is less than a minimum pre-determined value. When a server determines that an item should be obscured, the server can send to the user device the identity of an item to be obscured.

From a still or live video image, the server's analysis can identify distinct items or objects as the first part of the analysis of the imagery. Each object can be given an ID that is shared between the various computing devices, such as the server and user devices. In some embodiments, if the device that is receiving the image data about the scene has enough computing power, an instruction can be transmitted to the image data receiving device to obscure one or more object with the corresponding specific IDs. In some embodiments, if a display device receiving the image data about the scene lacks computing power, a mobile device can receive the one or more object IDs to be obscured from the server and the mobile device can translate the one or more object IDs information into one or more areas to obscure and transmit that instruction to the display device.

In some embodiments, before a user device can send image data to a server to obtain information about one or more items in the image data, the user device can determine a location of the user device and ascertain whether the location is associated with a place that performs transactions (e.g., a place that a user can make a purchase). Using the example provided in FIG. 1A, in some embodiments, the user device or server can determine a location of the user device, using, for example, geo-coordinates or latitude and longitude, and ascertain that the particular location is associated with a "Downtown Car Dealership" that sells cars. As described in this patent document, the user device can subsequently receive image data, obtain identities and values of one or more items from a server, compare the value with a pre-determined value, and obscure one or more items based on the comparison. In some other embodiments, user device can provide its location information to a server and the server can ascertain whether a user device is located at a place that a performs transactions. In some embodiments, an identification of one or more objects from an image data and the subsequent determination of which objects to obscure may be performed without obtaining location information.

In some embodiments, the user device or server can provide recommendations to the user in the portion of the augmented reality device with obscured information. The recommendations can include recommendations specific to what is obscured. For example, assuming that a sporty car outside the user's budget was blurred, the recommendation area can mention a similar product within the user's budget such as "If you are looking for a sporty car, we recommend an XYZ car."

Figure 4:
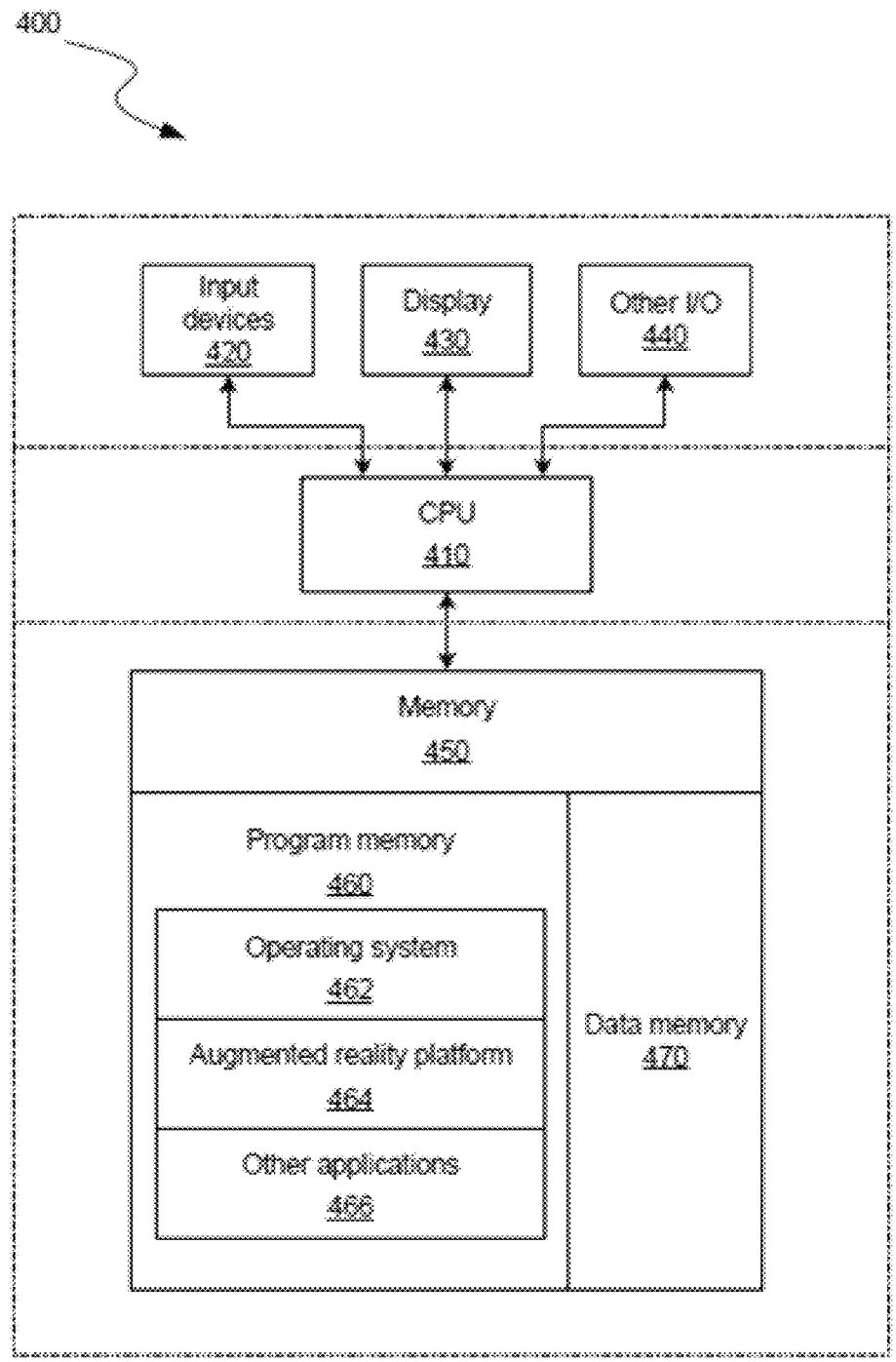
FIG. 4 is a block diagram illustrating an overview of devices on which some implementations can operate.

Those skilled in the art will appreciate that the components illustrated in FIGS. 4-6 described below, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described below can execute one or more of the processes described below.

Figure 2:
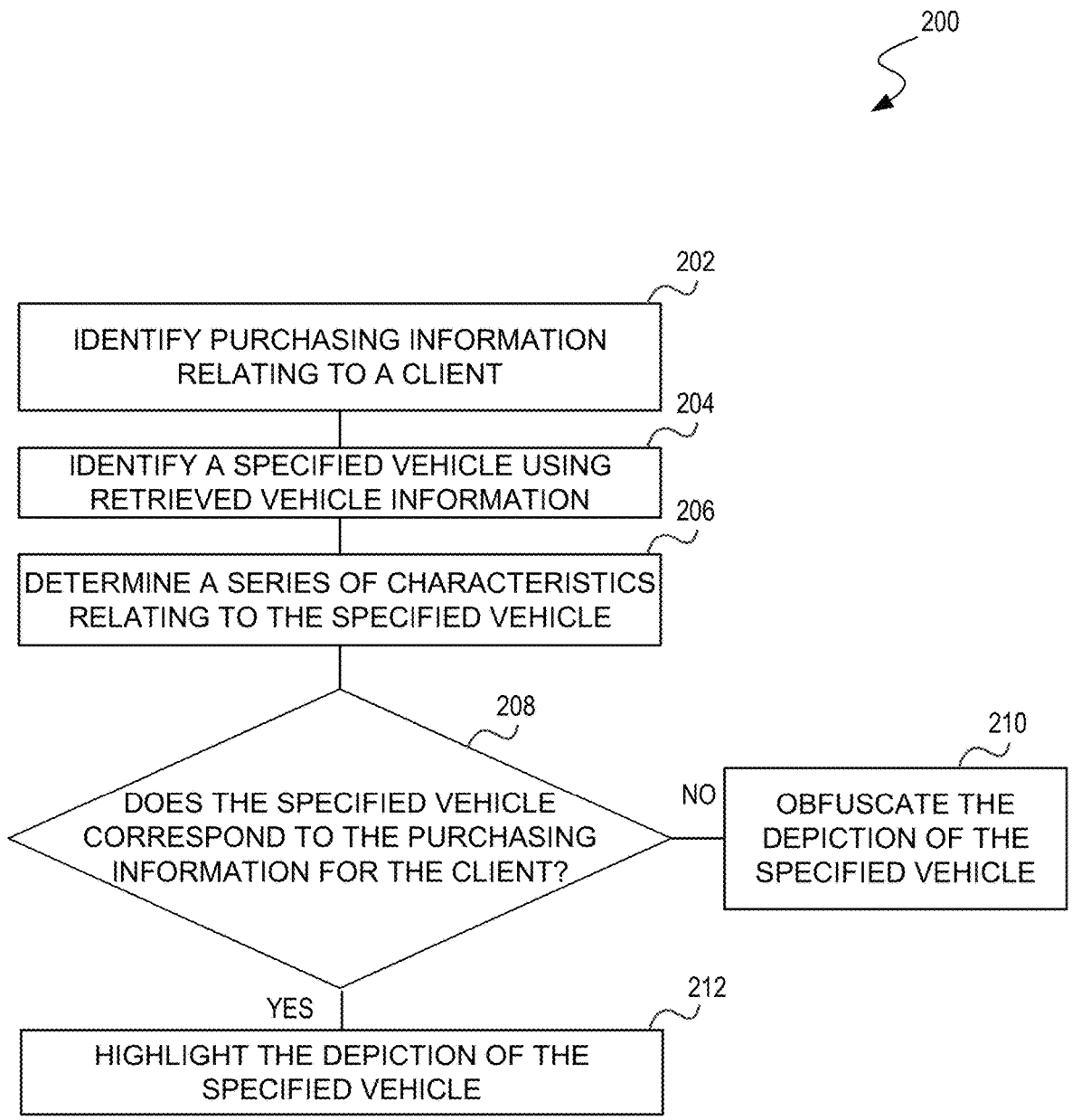
FIG. 2 is a flow chart of an example process to enhance a vehicle purchasing experience.

FIG. 2 is a flow chart 200 of an example process to enhance a vehicle purchasing experience. The process can include identifying purchasing information relating to a client (block 202). Purchasing information relating to a client can include any information used in determining whether a vehicle is applicable to a client.

This can include retrieving financial information relating to the client. The system can retrieve client information from third-party sources (e.g., a third-party credit monitoring server, a third-party financial institution) and/or request information from the client via a client device. Examples of client information can include an income of the client, a credit history of the client, other obligations to the client, amounts in other accounts, etc. In some embodiments, the system can process the financial information relating to the client to derive a maximum vehicle cost and/or a maximum financing value for an applicable vehicle, which is discussed in greater detail below.

Identifying the purchasing information relating to a client can also include retrieving desired vehicle characteristics for a vehicle. Desired vehicle characteristics can include any desirable features of a vehicle that is specific to the client. For instance, a desired vehicle characteristic can include a desired price range for a vehicle (e.g., only vehicles between $30,000 and $35,000). Other example desired vehicle characteristics can include a year range, a size/class of the vehicle, a fuel efficiency, fuel type, color, safety rating, estimated maintenance level, estimated operating life, etc. The desired vehicle characteristics can be used in determining whether a specified vehicle matches the desired vehicle characteristics for the client and whether the specified vehicle is presented to the client or obscured from the client.

The process can include identifying a specified vehicle using retrieved vehicle information (block 204). The identifying of a specified vehicle can include processing client AR device information to identify the vehicle. For example, images captured by the client AR device can be processed to detect a vehicle depicted in the images. As another example, a client, via client AR device, can select a vehicle from a listing of vehicles at a vehicle dealer (e.g., retrieved from a vehicle dealer website). In some instances, the specified vehicle can be identified based on scanning a code (e.g., a barcode, QR code), a geographic location of a vehicle in an environment and the client device in the environment, etc.

The system can retrieve vehicle inventory data from a vehicle dealer device. For example, the system can retrieve vehicle inventory data from a website maintained by a vehicle dealer. The system can populate tables/databases using vehicle data of the vehicles at the vehicle dealer using the retrieved vehicle inventory data. The system can identify a specified vehicle using the vehicle inventory data relating to a vehicle dealer.

The process can include determining a series of characteristics relating to the specified vehicle (block 206). The series of characteristics can include features specific for the specified vehicle. The system can utilize the vehicle inventory data relating to the specified vehicle to determine a portion of the characteristics relating to the specified vehicle (e.g., price, year, model, estimated fuel efficiency, mileage).

In some embodiments, determining the series of characteristics relating to the specified vehicle can include processing third-party server data to derive specialized characteristics relating to the vehicle. For instance, the system can retrieve accident/incident reports relating to the vehicle to determine whether the vehicle has been included in any accidents/incidents.

The system can process the accident/incident data to derive an estimated operating life of the vehicle. The estimated operating life of the vehicle can include an estimated life (e.g., operating time, miles) of the vehicle prior to the vehicle having major repair issues, breaking down, etc. The estimated operating life of the vehicle can be derived using various vehicle-specific data, such as a model year of the vehicle, mileage, number of accidents, average lifespan of the specific vehicle make-model, etc. The estimated operating life of the vehicle can include an indicator of whether the specified vehicle is a good deal given a purchase price of the vehicle.

The system can retrieve estimated maintenance costs for a specified vehicle from a third-party server. For instance, the server can use vehicle characteristics to derive estimated maintenance costs for that vehicle. The maintenance costs can be utilized in matching a client to a vehicle, as a maintenance cost that exceeds a desired amount can be detrimental to the purchase of a vehicle for the client.

The system can derive the characteristics for a selected vehicle on-demand (e.g., responsive to detecting the vehicle in an image captured in the AR device). In some instances, the system can derive characteristics for all vehicles for a vehicle dealer using the information specified above.

The process can include comparing the purchasing information relating to a client with the series of characteristics relating to the specified vehicle to determine if the specified vehicle corresponds to the purchasing information for the client (decision block 208).

This can include comparing features relating to the purchasing information of the client with a corresponding characteristic of the specified vehicle. For instance, a desired price range (e.g., between $25,000 and $35,000) for the client can be compared with a price (or an estimated value range) of the specified vehicle. In this example, if the price of the vehicle is outside of the desired price range (e.g., the price of the vehicle is $50,000), the specified vehicle may not correspond with the features of the client. In other instances, in this example, if the price of the vehicle is within the desired price range (e.g., the price of the vehicle is $28,000), the specified vehicle may correspond with the features of the client.

In some embodiments, if a threshold number of characteristics relating to the vehicle correspond to desired client features, the specified vehicle may correspond to the client. In other embodiments, if the characteristics relating to the vehicle satisfy one or more rules derived for the client, the specified vehicle may correspond to the client. For example, a set of rules for a client can specify that if a vehicle corresponds to the client when a price of the vehicle is within a first range, a mileage is below a threshold level, an estimated maintenance cost is below a threshold value, and an estimated operating life exceeds a threshold duration, the vehicle corresponds to the client.

If it is determined that the specified vehicle fails to correspond to the characteristics for the client, the display may obfuscate the depiction of the specified vehicle (block 210). Obfuscating the depiction of the specified vehicle can include removing the depiction of the vehicle from the display, greying out the vehicle on the display, adding an 'X' on the depiction of the vehicle on the display, etc.

If it is determined that the specified vehicle corresponds to the characteristics for the client, the display can highlight the depiction of the specified vehicle (block 212). This can include adding additional information to the display near or above the specified vehicle, such as highlighting the vehicle, adding relevant information above the vehicle, etc. For instance, if a vehicle is within a price range of a budget for the client and is priced at a good deal relative to similar vehicles, an AR/VR display can add the words "Good Deal!" above the depiction of the vehicle on the display.

Figure 3:
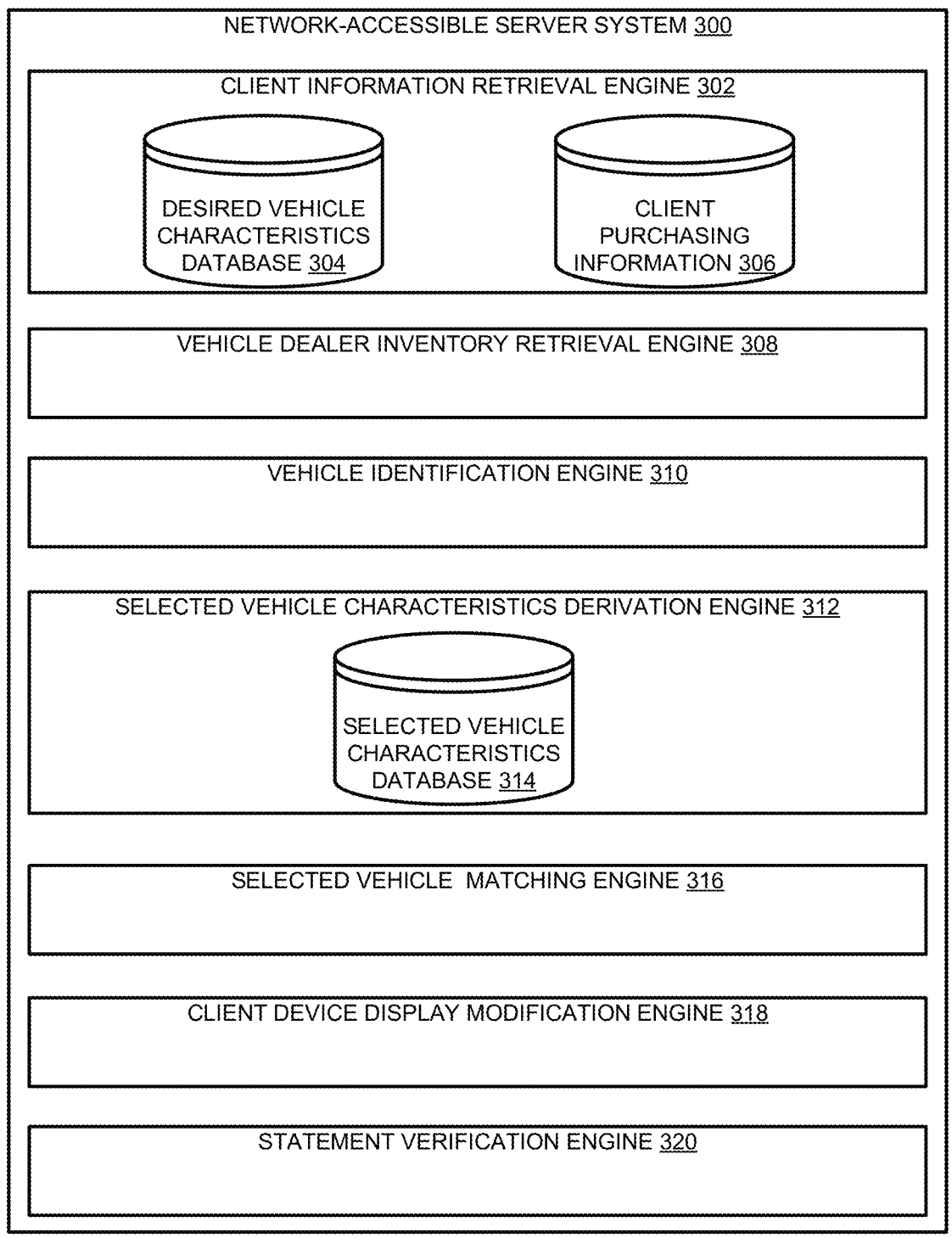
FIG. 3 is a block diagram of an example network-accessible server system.

FIG. 3 is a block diagram of an example network-accessible server system 300. The network-accessible server system 300 can include a client information retrieval engine 302. As noted above, client information can include a series of information relating to the purchase of a vehicle. For example, this can include desired vehicle characteristics (e.g., a desired price range for the vehicle) and/or purchasing information (e.g., a credit score, an income) relating to the client.

The client can provide desired vehicle information via the client device (e.g., an application executing on the client device), via a set of audio responses, etc. The desired vehicle characteristics can include any desired features for a vehicle, such as vehicle cost, type, size, fuel type, fuel efficiency, mileage, year, safety rating, maintenance cost, insurance premium, etc. The desired vehicle characteristics can be stored in a desired vehicle characteristics database 304.

The client information can also include client purchasing information. Purchasing information for a client can include information indicative of an amount that the client can purchase/finance for a vehicle. Examples of retrieved purchasing information for a client can include a credit score, income, other liabilities, etc. The purchasing information for the client can be used to derive a maximum value and/or a recommended value for purchasing a vehicle. In some instances, the purchasing information can be used for deriving a financing amount allowed for the client to purchase a vehicle. The purchasing information can be processed internally or by a third-party financing device. This may include retrieving client purchasing information from a third-party credit monitoring node or requesting the information directly from the client. The client purchasing information can be maintained in a client purchasing information database 306.

The network-accessible server system 300 can include a vehicle dealer inventory retrieval engine 308. The vehicle dealer inventory retrieval engine 308 can identify a relevant vehicle dealer associated with the client and process information relating to vehicles associated with the vehicle dealer. A vehicle dealer can be identified by the client, determined by a geographic proximity between the client device and the vehicle dealer, by scanning a code associated with the vehicle dealer, etc.

The vehicle dealer inventory retrieval engine 308 can obtain vehicle dealer inventory data from a source (e.g., a dealer website, dealer servers), and populate tables/databases with the vehicle dealer inventory data providing features of vehicles offered by the vehicle dealer.

The network-accessible server system 300 can include a vehicle identification engine 310. The vehicle identification engine 310 can identify a specified vehicle relevant to the client. The vehicle identification engine 310 can identify the specified vehicle by detecting a selection on an interface by the client, processing images on a client AR/VR device to identify a vehicle, scanning a code/license plate, etc.

The network-accessible server system 300 can include a selected vehicle characteristics derivation engine 312. The selected vehicle characteristics derivation engine 312 can process the retrieved information for the selected vehicle (e.g., from a vehicle dealer website) to derive characteristics. This can include identifying vehicle information of various types (e.g., price, vehicle type, model, size, fuel type, mileage). The system can compare known data types with the vehicle information to identify portions of the data relating to each data type.

The system can utilize both vehicle dealer inventory information and/or other third-party data to derive the vehicle characteristics. Other third-party data can include vehicle accident report databases, government entity databases, databases storing average vehicle characteristics, etc.

In some embodiments, the system can derive an estimated maintenance cost of the vehicle. The system can use known maintenance cost data for a specific vehicle make/model, a mileage of the vehicle, etc. to derive an estimated value to maintain the car during a duration (e.g., a year).

In some embodiments the system can derive an estimated remaining operating life of the selected vehicle. The estimated remaining operating life can be derived using average operating life for a vehicle, a mileage of the vehicle, a number of accidents that the vehicle is involved in, prior maintenance issues with the vehicle, etc.

In some embodiments the system can derive an estimated insurance rate for the specified vehicle. The estimated insurance rate can be based on various factors relating to the vehicle, such as vehicle price, type, etc. The selected vehicle characteristics can be stored in a selected vehicle characteristics database 314.

The network-accessible server system 300 can include a selected vehicle matching engine 316. The selected vehicle matching engine 316 can compare the selected vehicle characteristics and the desired vehicle characteristics for the client to determine whether the selected vehicle corresponds to the client.

This can include determining whether each selected vehicle characteristic type is within a range of a corresponding desired client characteristic or within a threshold similarity to the corresponding desired client characteristic. As an example, if the client desired characteristic for a mileage of a vehicle is between 50,000 miles and 80,000 miles, and the mileage of a selected vehicle is 60,000, the characteristic of the vehicle corresponds to a desired characteristic for the client. As another example, if a desired price for a vehicle is under $40,000 and the price for the specific vehicle is $52,000, the characteristic of the selected vehicle may not correspond to the desired price for the client.

In some instances, if all desired characteristics specified by the client are met by vehicle characteristics, the specified vehicle may correspond to the client. In other embodiments, if a threshold number of characteristics are common between the vehicle and the desired client characteristics, the specified vehicle may correspond to the client. A number of rules may be utilized in determining whether the vehicle characteristics correspond to the desired client characteristics. Various characteristic types can be weighted in determining whether the vehicle characteristics correspond to the desired client characteristics.

The network-accessible server system 300 can include a client device display modification engine 318. The client device display modification engine 318 can instruct a client device (e.g., an AR/VR-enabled electronic device) to update a display based on whether a specified vehicle corresponds to the desired characteristics provided by the client.

The update to the display can include either obfuscating (e.g., greying out) a specified vehicle if it does not correspond to the to the desired characteristics provided by the client, adding a highlight (e.g., a star above the specified vehicle, features of the vehicle) to a specified vehicle that corresponds to the desired characteristics provided by the client, etc. The network-accessible server system 300 and/or a client device can identify the depiction of the specified vehicle in the display by processing images captured by the client device. The update to the display can include an on-demand overlay of computer-generated data over a depiction of the real-world environment on the display of the client device. In other words, the obfuscation to the specified vehicle or a highlight to the specified vehicle can remain on the portion of the display depicting the specified vehicle as the cameras capturing the environment move about the environment.

The network-accessible server system 300 can include a statement verification engine 320. The statement verification engine 320 can process an input (e.g., a text-based input, a statement provided by a seller of a specified vehicle) to derive an accuracy of the input. The system can compare portions of the statement against known information about the specified vehicle to determine an accuracy of the statement.

For example, if a salesperson of a specified vehicle indicates that the specified vehicle is a "great price," the system can compare the statement with known vehicle characteristics to determine an accuracy of the statement. This can include processing information relating to the vehicle provided by the vehicle dealer, information relating to all vehicles of a specific type, etc. In the above example, the system can retrieve average sales prices for a vehicle of a similar type and determine if a price for the specified vehicle is within an acceptable range of similar vehicle sales. If the price for the specified vehicle is at a lower end of a range of average sales prices, the system can determine that the statement was accurate. Alternatively, if the price for the specified vehicle above the range of average sales prices, the system can determine that the statement was inaccurate.

As another example, if a vehicle seller states that the specified vehicle has a "low maintenance cost," the system can identify whether an estimated maintenance cost for the specified vehicle is lower than an average maintenance cost for vehicles of a similar type or for all vehicles. The system can provide a response based on a determined accuracy of the statement. The response can be associated with a confidence level indicative of a confidence in the accuracy of the response.

The system can instruct the client device to perform a task based on a determined accuracy of a statement. For instance, if a statement is identified as inaccurate, the system can output a sound, indication on the client device, etc. indicating that the statement is inaccurate. Alternatively, if a statement is identified as accurate, the system can output a sound, indication on the client device, etc. indicating that the statement is accurate.

Several implementations are discussed below in more detail in reference to the figures. FIG. 4 is a block diagram illustrating an overview of devices on which some implementations of the disclosed technology can operate. The devices can comprise hardware components of a device 400 that send image data from an area that includes one or more items from a real-world, receive the identity and characteristics of one or more items, and obscure one or items based on pre-determined values. Device 400 can include one or more input devices 420 that provide input to a CPU (processor) or GPU 410, notifying it of actions. The actions are typically mediated by a hardware controller that interprets the signals received from the input device and communicates the information to the CPU or GPU 410 using a communication protocol. Input devices 420 include, for example, a mouse, a keyboard, a touchscreen, an infrared sensor, a touchpad, a wearable input device, a camera- or image-based input device, a microphone, or other user input devices.

CPU or GPU 410 can be a single processing unit or multiple processing units in a device or distributed across multiple devices. CPU or GPU 410 can be coupled to other hardware devices, for example, with the use of a bus, such as a PCI bus or SCSI bus. The CPU or GPU 410 can communicate with a hardware controller for devices, such as for a display 430. Display 430 can be used to display text and graphics. In some examples, display 430 provides graphical and textual visual feedback to a user. In some implementations, display 430 includes the input device as part of the display, such as when the input device is a touchscreen or is equipped with an eye direction monitoring system. In some implementations, the display is separate from the input device. Examples of display devices are: an LCD display screen; an LED display screen; a projected, three-dimensional, holographic, or augmented reality display (such as a heads-up display device or a head-mounted device); and so on. Other I/O devices 440 can also be coupled to the processor, such as a network card, video card, audio card, USB, FireWire or other external device, camera, printer, speakers, CD-ROM drive, DVD drive, disk drive, or Blu-Ray device.

In some implementations, the device 400 also includes a communication device capable of communicating wirelessly or wire-based with a network node. The communication device can communicate with another device or a server through a network using, for example, TCP/IP protocols. Device 400 can utilize the communication device to distribute operations across multiple network devices.

The CPU or GPU 410 can have access to a memory 450. A memory includes one or more of various hardware devices for volatile and non-volatile storage and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 450 can include program memory 460 that stores programs and software, such as an operating system 462, augmented reality platform 464, and other application programs 466. Memory 450 can also include data memory 470 that can include pre-determined values for an item or a category of the item, designations to identify whether the pre-determined values are maximum or minimum values, settings, or preferences, etc., which can be provided to the program memory 460 or any element of the device 400.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 5:
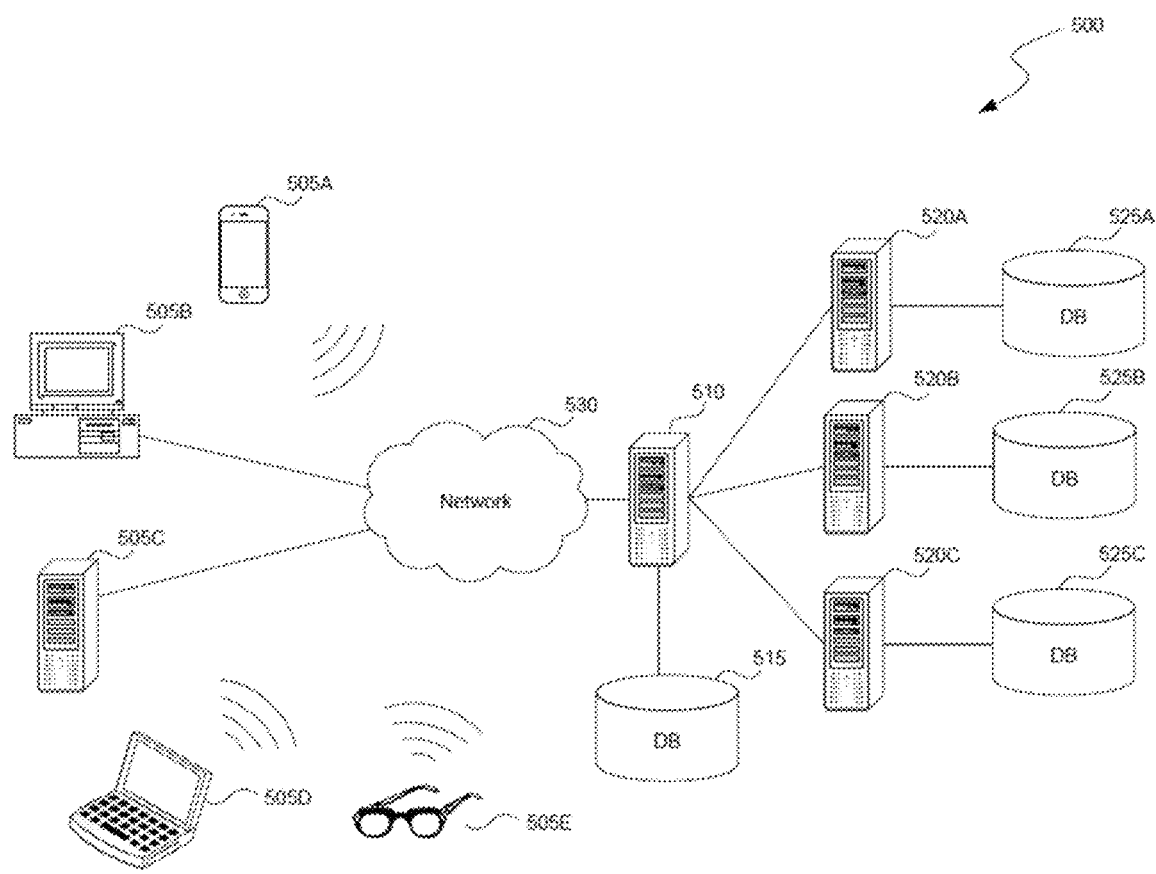
FIG. 5 is a block diagram illustrating an overview of an environment in which some implementations can operate.

FIG. 5 is a block diagram illustrating an overview of an environment 500 in which some implementations of the disclosed technology can operate. Environment 500 can include one or more client computing devices 505A-E, examples of which can include device 400. Client computing devices 505 can operate in a networked environment using logical connections through network 530 to one or more remote computers, such as a server computing device 510.

In some implementations, server computing device 510 can be an edge server that receives client requests and coordinates fulfillment of those requests through other servers, such as servers 520A-C. Server computing devices 510 and 520 can comprise computing systems, such as device 400. Though each server computing device 510 and 520 is displayed logically as a single server, server computing devices can each be a distributed computing environment encompassing multiple computing devices located at the same or at geographically disparate physical locations. In some implementations, each server computing device 520 corresponds to a group of servers.

Client computing devices 505 and server computing devices 510 and 520 can each act as a server or client to other server/client devices. Server 510 can connect to a database 515. Servers 520A-C can each connect to a corresponding database 525A-C. As discussed above, each server 520 can correspond to a group of servers, and each of these servers can share a database or can have their own database. Databases 515 and 525 can warehouse (e.g., store) information such as pre-determined values for an item or a category of the item, designations to identify whether the pre-determined values are maximum or minimum values, identities and characteristics of items, or location information. Though databases 515 and 525 are displayed logically as single units, databases 515 and 525 can each be a distributed computing environment encompassing multiple computing devices, can be located within their corresponding server, or can be located at the same or at geographically disparate physical locations.

Network 530 can be a local area network (LAN) or a wide area network (WAN), but can also be other wired or wireless networks. Network 530 may be the Internet or some other public or private network. Client computing devices 505 can be connected to network 530 through a network interface, such as by wired or wireless communication. While the connections between server 510 and servers 520 are shown as separate connections, these connections can be any kind of local, wide area, wired, or wireless network, including network 530 or a separate public or private network.

Figure 6:
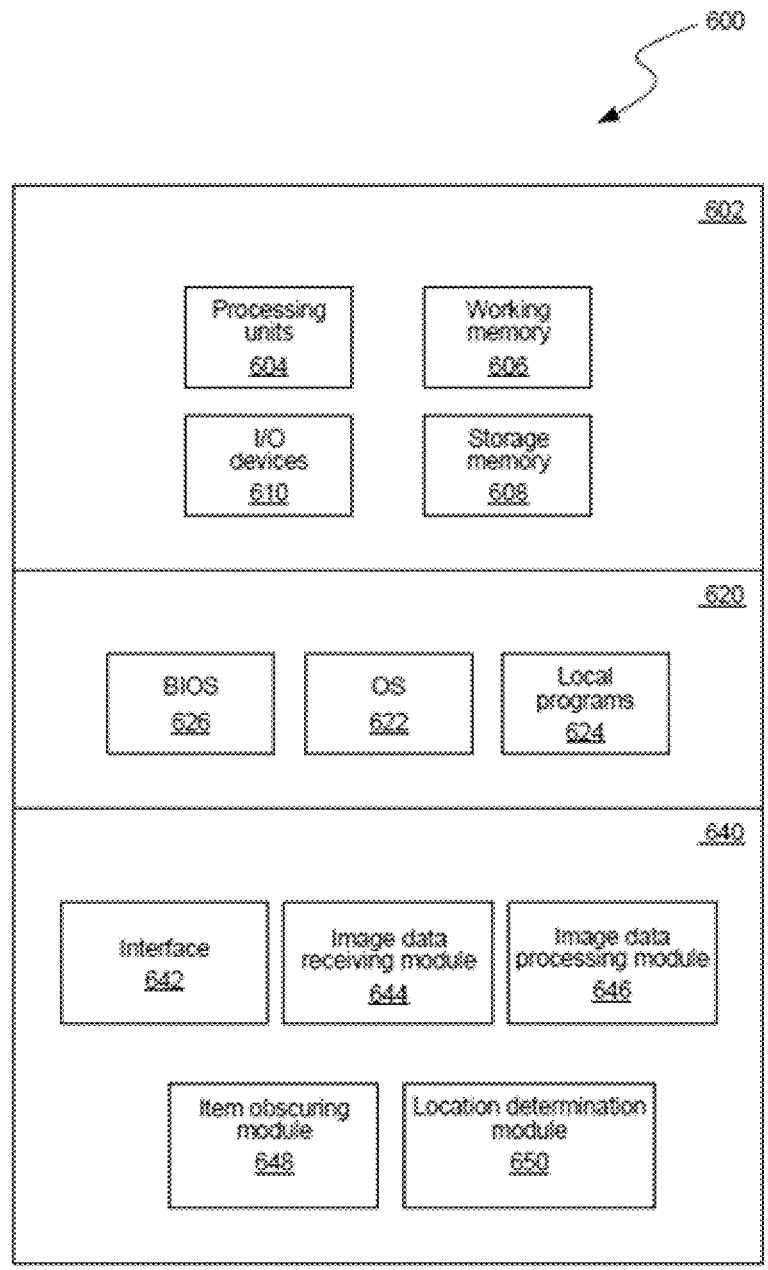
FIG. 6 is a block diagram illustrating components which, in some implementations, can be used in a system employing the disclosed technology.

FIG. 6 is a block diagram illustrating components 600 which, in some implementations, can be used in a system employing the disclosed technology. The components 600 include hardware 602, general software 620, and specialized components 640. As discussed above, a system implementing the disclosed technology can use various hardware, including processing units 604 (e.g., CPUs, GPUs, APUs, etc.), working memory 606, storage memory 608, and input and output devices 610. Components 600 can be implemented in a client computing device such as client computing devices 505 or on a server computing device, such as server computing device 510 or 520.

General software 620 can include various applications, including an operating system 622, local programs 624, and a basic input output system (BIOS) 626. Specialized components 640 can be subcomponents of a general software application 620, such as local programs 624. Specialized components 640 can include an augmented reality platform that includes an image data receiving module 644, image data processing module 646, item obscuring module 648, location determination module 650, and components that can be used for transferring data and controlling the specialized components, such as interface 642. In some implementations, components 600 can be in a computing system that is distributed across multiple computing devices or can be an interface to a server-based application executing one or more of specialized components 640.

Image data receiving module 644 receives image data of an area that includes one or more items from a real world. The image data receiving module 644 can send the received image data to the image data processing module 646 where the image data is be processed to obtain an identity and other characteristics of the items in the image data. The characteristics of the items may include, for example, a cost of the item or other characteristics relevant to the identified items. An example of other characteristics can include fuel economy if the identified item is a car, or a nutritional value if the identified item is a food item, or a consumer rating if the item is television.

Item obscuring module 648 can compare the value of an item included in the image data with a pre-determined value. In some implementations, the pre-determined value can be a maximum user defined value so that the item obscuring module 648 can obscure in real-time on the displayed image the item or category of the item that has a value that is greater than the pre-determined value. In some other implementations, the pre-determined value can be a minimum user defined value so that the item obscuring module 648 can obscure in real-time on the displayed image the item or category of the item that has a value that is less than the pre-determined value. The item obscuring module 648 can obscure an item by blurring the item, graying out the item, or obscuring source-identifying information of the item.

Item obscuring module 648 can also determine how to compare the value of the item with the pre-determined value. In some implementations, an inequality indicator, such as a greater than or less than symbol, can be provided by the item obscuring module 648 based on a user selection of how an item's characteristics can be compared to a user set pre-determined value. For example, if a user wants to purchase a car, the user can set a maximum budget of $20,000, or the value can result from a budgeting software used by the user. The item obscuring module 648 can store or retrieve from a database the maximum budget with a "greater than" symbol to indicate that items over $20,000 are obscured by the item obscuring module 648. As another example, a user can set a pre-determined range of values so that the item obscuring module 648 can obscure one or more items that fall out of the range of the maximum and minimum values that may be set by the user. In some embodiments, items can be categorically obscured or hidden. For example, users can set a preference of obscuring all products made by a certain company.

The location determination module 650 can determine a location of a user device and can ascertain whether the location of the user device is associated with a place that performs transactions, such as financial or purchasing transactions. In some implementations, if the location determination module 650 determines that a user device is located at or near a transaction, the location determination module 650 can initiate a process of receiving image data to be further processed as described in this patent document.

Those skilled in the art will appreciate that the components illustrated in FIGS. 4-6 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

Several implementations of the disclosed technology are described above in reference to the figures. The computing devices on which the described technology may be implemented can include one or more central processing units, memory, input devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A computer-implemented method for updating an augmented reality (AR) display on a client device based on whether specified vehicles correspond to a set of client-specified characteristics for a desired vehicle, the computer-implemented method comprising:
    obtaining a set of client-specified characteristics for a desired vehicle from a client device associated with a client;
    processing image data captured by the client device to identify at least a first vehicle and a second vehicle;
    retrieving, from a vehicle vendor server, a first set of vehicle characteristics for the first vehicle and a second set of vehicle characteristics for the second vehicle;
    for each vehicle characteristic type in the first set of vehicle characteristics, determining whether the vehicle characteristic of the first set of vehicle characteristics is within a threshold range of a corresponding client-specified characteristic;
    for each vehicle characteristic type in the second set of vehicle characteristics, determining whether the vehicle characteristic of the second set of vehicle characteristics is within a threshold range of a corresponding client-specified characteristic;
    responsive to determining that a number of the first set of vehicle characteristics that are within the threshold range of the corresponding client-specified characteristics exceed a threshold number, updating the AR display on the client device to overlay a computer-generated indication that the first vehicle corresponds to the set of client-specified characteristics over a depiction of a real-world environment; and
    responsive to determining that a number of the second set of vehicle characteristics that are within the threshold range of the corresponding client-specified characteristics falls below the threshold number, updating the AR display on the client device to:
        obfuscate the second vehicle on the AR display of the client device, and
        display a vehicle recommendation within an area of the AR display that contains the obfuscated second vehicle, wherein the vehicle recommendation corresponds to the client-specified characteristics.

2. The computer-implemented method of claim 1, wherein processing the image data captured by the client device to identify the at least two vehicles further comprises:
    retrieving a listing of vehicle images from the vehicle vendor server; and
    comparing the image data captured by the client device with the listing of vehicle images to identify a first and second images depicting the first and second vehicles.

3. The computer-implemented method of claim 1, wherein the set of client-specified characteristics for the desired vehicle include information obtained from the client device and information derived from purchasing information associated with the client.

4. The computer-implemented method of claim 1, further comprising:
    identifying a portion of the AR display that depicts the first vehicle;
    identifying a first characteristic included in the first set of vehicle characteristics for the first vehicle that is within the threshold range of a corresponding client-specified characteristic; and
    updating the AR display to overlay a text depiction of the first characteristic above the portion of the AR display depicting the first vehicle in the depiction of the real-world environment.

5. The computer-implemented method of claim 1, further comprising:
    detecting an input statement at the client device;
    parsing the input statement to identify a series of text-based keywords in the input statement;
    determining whether the series of text-based keywords in the input statement correspond to the first set of vehicle characteristics; and
    responding to the determining by:
        responsive to determining that the series of text-based keywords in the input statement corresponds to the first set of vehicle characteristics, causing a first output of a first type on the client device; or
        responsive to determining that the series of text-based keywords in the input statement does not correspond to the first set of vehicle characteristics, causing a second output of a second type on the client device.

6. The computer-implemented method of claim 1, further comprising:

responsive to determining that a number of the first set of vehicle characteristics that are within the threshold range of the corresponding client-specified characteristics exceed a threshold number, updating the AR display on the client device to highlight the first vehicle in the AR display.

7. A system to update an augmented reality (AR) display on a client device based on whether specified vehicles correspond to a set of client-specified characteristics for a desired vehicle, the system comprising:
 a client device configured to:
  obtain a series of image data depicting a real-world environment;
  obtain a set of client-specified characteristics for a desired vehicle from a client; and
  display the depiction of the real-world environment on an AR display of the client device, the client device configured to overlay computer-generated data on the depiction of the real-world environment on the AR display; and
 a network-accessible computing system configured to:
  process the image data captured by the client device to identify at least a first vehicle and a second vehicle;
  retrieve a first set of vehicle characteristics for the first vehicle and a second set of vehicle characteristics for the second vehicle;
  for each vehicle characteristic type in the first set of vehicle characteristics, determine whether the vehicle characteristic of the first set of vehicle characteristics is within a threshold range of a corresponding client-specified characteristic;
  for each vehicle characteristic type in the second set of vehicle characteristics, determine whether the vehicle characteristic of the second set of vehicle characteristics is within a threshold range of a corresponding client-specified characteristic;
  responsive to determining that a number of the first set of vehicle characteristics that are within the threshold range of the corresponding client-specified characteristics exceed a threshold number, provide first instructions to the client device to update the AR display on the client device, wherein, in response to the first instructions, the client device updates the AR display to overlay a computer-generated indication that the first vehicle corresponds to the set of client-specified characteristics over a depiction of a real-world environment; and
  responsive to determining that the number of the second set of vehicle characteristics that are within the threshold range of the corresponding client-specified characteristics fall below the threshold number, provide second instructions to the client device to update the AR display on the client device, wherein, in response to the second instructions, the client device updates the AR display to:
   obfuscate the second vehicle on the AR display of the client device, and
   display a vehicle recommendation within an area of the AR display that contains the obfuscated second vehicle, wherein the vehicle recommendation corresponds to the client-specified characteristics.

8. The system of claim 7, wherein the AR display is configured to obfuscate the second vehicle by any one of:
 obscuring by inserting an opaque polygon into the image data,
 obscuring by inserting a semi-transparent polygon into the image data,
 obscuring by pixelating the second vehicle, and
 obscuring by reconstructing an inferred background of the second vehicle to give an impression that the second vehicle is not there.

9. The system of claim 7, wherein the network-accessible computing system is further configured to:
 retrieve a listing of vehicle images from a vehicle vendor server;
 populate a database with data from the vehicle vendor server, wherein the set of vehicle characteristics for the specific vehicle are derived from the data retrieved from the vehicle vendor server; and
 compare the image data captured by the client device with the listing of vehicle images to identify a first image depicting the first vehicle and a second image depicting the second vehicle.

10. The system of claim 7, wherein the network-accessible computing system is further configured to:
 identify a portion of the AR display that depicts the first vehicle;
 identify a first characteristic included in the first set of vehicle characteristics for the first vehicle that is within the threshold range of a corresponding client-specified characteristic; and
 instruct the client device to update the AR display to overlay a text depiction of the first characteristic above the portion of the AR display depicting the first vehicle in the depiction of the real-world environment.

11. The system of claim 7, wherein the network-accessible computing system is further configured to:
 detect an input statement at the client device;
 parse the input statement to identify a series of text-based keywords in the input statement;
 determine whether the series of text-based keywords in the input statement correspond to the first set of vehicle characteristics; and
 respond to the determining by:
  responsive to determining that the series of text-based keywords in the input statement corresponds to the first set of vehicle characteristics, cause a first output of a first type on the client device; or
  responsive to determining that the series of text-based keywords in the input statement does not correspond to the first set of vehicle characteristics, cause a second output of a second type on the client device.

12. A non-transitory machine-readable medium having machine executable instructions stored thereon that, when executed by one or more processors, direct the one or more processors to perform a method comprising:
 obtaining a set of client-specified characteristics for an object from a client device associated with a client;
 processing image data captured by the client device to detect a first object and a second object;
 retrieving a first set of characteristics for the first object and a second set of characteristics for the second object;
 for each characteristic type in the first set of characteristics for the first object, determining whether the vehicle characteristic of the first set of vehicle characteristics is within a threshold range of a corresponding client-specified characteristic;
 for each characteristic type in the second set of characteristics for the first object, determining whether the vehicle characteristic of the second set of vehicle characteristics is within a threshold range of a corresponding client-specified characteristic;

responsive to determining that a number of the first set of characteristics that are within the threshold range of corresponding client-specified characteristics exceed a threshold number, updating a display on the client device to overlay a computer-generated indication that the first object corresponds to the set of client-specified characteristics over a depiction of a real-world environment; and responsive to determining that a number of the second set of characteristics that are within the threshold range of corresponding client-specified characteristics falls below the threshold number, updating the display on the client device to;

obfuscate the second object on the display of the client device, and display a recommendation within an area of the display that contains the obfuscated second object, wherein the recommendation corresponds to the client-specified characteristics.

13. The non-transitory machine-readable medium of claim 12, wherein processing the image data captured by the client device to detect the first object and the second object further comprises:

retrieving a listing of images from a vendor of the first device; and comparing the image data captured by the client device with the listing of images to identify a first image depicting the first object and a second image depicting the second object.

14. The non-transitory machine-readable medium of claim 12, wherein the method further comprises:

identifying a portion of the display that depicts the first object;

identifying a first characteristic included in the first set of characteristics for the first object that is within the threshold range of a corresponding client-specified characteristic; and updating the display to overlay a text depiction of the first characteristic above the portion of the display depicting the first object in the depiction of the real-world environment.

15. The non-transitory machine-readable medium of claim 12, wherein the method further comprises:

detecting an input statement at the client device;

parsing the input statement to identify a series of text-based keywords in the input statement;

determining whether the series of text-based keywords in the input statement correspond to the first set of characteristics for the first object; and in response to the determining:

responsive to determining that the series of text-based keywords in the input statement corresponds to the first set of characteristics, causing a first output of a first type on the client device; or responsive to determining that the series of text-based keywords in the input statement does not correspond to the first set of characteristics, causing a second output of a second type on the client device.

16. The non-transitory machine-readable medium of claim 12, wherein the first object is a vehicle, and wherein the client device includes any one of a smartphone, a tablet, and a digital eyeglass device.

17. The non-transitory machine-readable medium of claim 12, wherein the display is configured to obscure the second object by any one of:

obscuring by inserting an opaque polygon into the image data, obscuring by inserting a semi-transparent polygon into the image data, obscuring by pixelating the first object, and obscuring by reconstructing an inferred background of the first object to give an impression that the first object is not there.

* * * * *